Patented May 22, 1945

2,376,693

UNITED STATES PATENT OFFICE 2,376,693

SOFT CURD MILK

Raymond G. Helmer and Merle G. Farnham, Milwaukee, Wis., assignors to Chr. Hansen's Laboratory, Inc., Little Falls, N. Y.

No Drawing. Application December 30, 1940, Serial No. 372,395

13 Claims. (Cl. 99—54)

This invention relates to milk which has been rendered more readily digestible by treatment with a proteolytic or a milk curdling enzyme, and has for its principal object the provision of such a low curd tension milk which will stand boiling.

A further object of the invention is to provide a method of mixing untreated milk with the rennet enzyme treated milk, which because of such treatment flakes or curdles on boiling, in such a ratio that the resulting curd tension is below 33 grams and preferably is 20 grams or below and yet will not flake or curdle on boiling.

A still further object of my invention is the provision of a method of adding of hard curd milk to milk, the curd tension of which has been reduced to below that of soft curd milk, in such a proportion as to give a mixture containing at least 15% of hard curd milk and not more than 85% of rennet enzyme treated milk, the curd tension of the latter having previously been reduced sufficiently so that above-mentioned mixture has a curd tension below 30 grams and preferably 20 grams or less, such mixture having the property of not flaking or curdling on boiling.

The curd tension of milk may be reduced to 20 grams or below by:

(1) Mixing 100 parts of milk with 20 to 25 parts of evaporated milk, and 20 to 25 parts of water.

(2) By immersing a container of the milk in a bath of boiling water from one to five hours, the time depending upon the original curd tension of the milk and the curd tension desired. For instance, raw milk with a curd tension of 55 was heated in a water bath for various periods after the milk had reached the temperature of 200° F. and gave the curd tensions tabulated below:

| No. of hours in bath | Curd tension |
|---|---|
|  | Grams |
| 1 | 20 |
| 2 | 16 |
| 3 | 12 |
| 4 | 8 |

This indicates that the reduction in curd tension is approximately proportionate to the time of exposure in the bath of boiling water.

We have also found that milk which has previously been treated with a milk curdling enzyme to give soft curd milk of low curd tension, can be stabilized against flaking or curdling on boiling, by the addition of evaporated milk. For example, 100 parts of soft curd milk, diluted with at least 20 parts of evaporated milk and 20 parts of water, will make a milk which will not show flaking or curdling on boiling altho its curd tension is zero. When evaporated milk was added to soft curd milk during the processing, and held at 145° F. for 30 minutes, the resulting milk was not stable to boiling. The same amount added to soft curd milk, after processing and cooling, however, will stabilize the finished product.

We have also found that when raw whole milk, which has been heated in a flask over a boiling water bath for several hours, is added to soft curd milk prepared by treatment with the milk curdling enzyme, in the proportion of 100 parts of the treated soft curd milk to 20 to 25 parts of the boiled milk, the resulting mixture likewise is stabilized against flaking or curdling on boiling.

We have also found that one method of stabilizing rennet-treated milk against flaking or curdling on boiling is to heat the milk gradually to 160–165° F., holding at this temperature for one-half hour and then cooling. In this way there is provided a very simple method of lowering the curd tension of milk with rennet to approximately 20 grams or below, and stabilizing such milk against flaking or curdling on boiling. In all the above experiments, however, a cooked flavor, found undesirable to most customers, is produced, and in the cases where heat is applied above the usual pasteurizing temperature of 145° F., the cream line is somewhat impaired.

The object of our present invention therefore is to provide a method of producing a rennet enzyme treated milk, which will not flake or curdle on boiling, and which will neither have a cooked flavor nor an impaired cream line.

A simple method of carrying out the present invention is to heat raw or whole milk to 125° F. and while holding it at this temperature, such predetermined quantity of rennet enzyme as would completely curdle the milk in from 15 to 20 minutes is added and thoroughly dispersed in the milk. On account of the varying factors, definite limits for the rennet enzyme cannot be established for universal use; but knowing these factors and the well-known methods of laboratory control, among which are included the lactometer, the commercial rennet test used in cheesemaking, the Mann's test for acidity, an accepted curd tension apparatus, the alcohol test and a heating or boiling test, a skilled worker in the art can readily establish the amount of rennet enzyme of a given standard strength necessary under the wide range of conditions which may be encountered. There are several methods of measuring the curd tension but for the purpose of this patent the figures used are those of the Submarine Signal Company curdometer, which instrument and the Hill curdometer give closely agreeing values.

From time to time at definite intervals small quantities of milk are taken out and immediately shaken in a test tube with an equal volume of 46% alcohol. The alcohol percentum is not critical and may therefore be varied within reasonable limits, for example, from 50% to 40%, depending upon the milk. While the trial with alcohol is only an arbitrary test to determine when to stop the action of the enzyme in order to obtain the desired curd tension value, it is an excellent method of determining exactly when to start heating the milk to destroy the rennet enzyme, and is a highly practical manner of finding, in a minimum of time, what would happen to the milk if the temperature of the milk were allowed to increase to the boiling point.

When the milk sample shows curds when mixed with alcohol, which usually occurs in from 7 to 9 minutes, further heat is immediately applied and the milk is raised from its then temperature of about 125° F. to a pasteurizing temperature of 145° F. in a period which should not exceed ten minutes. At the end of this time, raw hard curd milk which in our locality has a curd tension but little above the soft curd maximum of 33 grams set for New York city, is added in concentrations of from 20% to 40% of the final mixture and the pasteurization of the resultant mixture is completed by holding the blend at the pasteurizing temperature for an additional half-hour. It is also possible to hold the rennin treated milk at a pasteurizing temperature (145° F.) for thirty minutes without any addition of raw milk and then after cooling, pasteurized hard curd milk can be added in the same percentage, that is, at least 20% of the final mixture of the cooled pasteurized soft curd milk and pasteurized hard curd milk. By either method of blending, the resultant product has a curd tension which does not exceed 20 grams and the milk is able to withstand boiling without the formation of curds.

In following such procedure the fat globules are not affected as would be the case where the milk is vibrated or homogenized as in such latter cases the number of fat globules is increased by breaking the larger sized globules into many smaller ones, which form points of weakness in the curd structure, thus giving a soft curd milk, but also preventing the formation of a sharp cream line. The unexpected result of the present invention lies in the fact that although the milk treated with the curding enzyme to a curd tension of less than 30 grams with subsequent pasteurization will always coagulate on boiling; milk treated as previously described, that is, 40 to 20% of untreated milk mixed with from 60 to 80% of rennet enzyme treated milk will not curdle upon boiling and will have a curd tension of approximately 20 grams. A skilled milk chemist would naturally expect that a mixture of rennet treated milk with a hard curd milk, with a mixture curd tension of 20 grams, would coagulate at least as readily upon boiling as milk treated with the rennet enzyme to a curd tension of 20 grams without any mixing.

Practical considerations require a reasonable margin of safety hence it is not desired to continue the action of the rennet too close to the coagulation point for this would require either too fast an application of heat or else the use of a smaller quantity of rennet enzyme. The less the curd tension of the milk is lowered with the rennet enzyme the greater the stability to heat of the milk. A value in the neighborhood of 15 grams is consequently a satisfactory curd tension for when the tension is materially increased the quantity of untreated milk that may be added is lessened, thus making it difficult to obtain a mixture of 20 grams or less which will be stable to boiling for a number of minutes.

In plotting curd tension against percent of untreated milk at say 34 grams tension in the mixture of untreated and treated milk, the latter having a 15 gram tension, we find a critical point at about 19% of hard curd milk in the mixture. Up to this percentage of untreated milk in the mixture, the mixtures are unstable to boiling but mixtures containing 20% and more of the untreated milk are stable to boiling for two, three, or more minutes. The rise in curd tension is relatively slow from 20% to 40% of the untreated milk, the higher figure giving a curd tension of about 20 grams, which is about 4 grams higher than with the lower figure of 20% untreated. The curve is horizontal from 0 to 15% of untreated milk, standing at the level of the curd tension of the treated milk, that is, at 15 grams. After 40% the curve rises in nearly a straight line from 20 grams curd tension to 30 grams at 65% when the curve forms a smooth, somewhat arcuate tangent to the final curd tension of 34 grams. With such milk the present invention therefore contemplates the range 20% to 40% of untreated milk to be added to the soft curd milk to give a curd tension of roughly from 15 to 20 grams, and contemplates a minimum of 20% untreated milk with whole milks of greater curd tensions.

With milks of a higher curd tension, the same type of curve is obtained and the same feature noted, that is, the actual curve is below the calculated curve in the region with which we are concerned, from percentages of 20 to 40 or more. We find with any milk the minimum percentage may accurately be calculated as 5% above that percentage at which fine flakes are produced when the mixed milk is boiled for three minutes, for example, a 33 gram milk will give fine flakes if the percentage of hard curd-treated portion is 15–85 but at 20–80 the mixture is stable. In the same manner a 40 gram milk at 21–79 gives flakes but at 26–74 the mixed milk will stand boiling for three minutes without any curdling.

Altho the preceding stresses the use of rennin, this is because of the statutory requirement that the invention be described in its best form. The milk curdling enzyme could be a less efficient one than rennin, as for example, papain, pancreatin, pepsin, etc., for the same unexpected result follows, i. e., an enzyme treated milk of a given curd tension (say 10) will curdle on boiling; an enzyme treated milk with a lower curd tension (say 5) mixed with hard curd milk to that given curd tension (say 10) will not curdle on boiling.

In the claims the word "untreated" means not treated with a milk curdling enzyme.

What we claim is:

1. The method of preparing a soft curd milk which will not flake or curdle on being brought to a boiling temperature, is free of a cooked flavor, and has a well defined cream line, which comprises: intimately mixing with a body of hard curd milk a milk curdling enzyme in such amount and for such time as to reduce the curd tension to less than twenty grams, rendering the enzyme inactive by heating the milk-enzyme mixture to a pasteurizing temperature shortly prior to the time at which the formation of curds would otherwise occur by action of the enzyme, then blending with the resulting fluid a minor quantity of untreated hard curd milk, said minor quantity varying between 15% and 40% of the final product and being great enough to avoid curdling on boiling and insufficient to increase the curd tension of the final product to above thirty grams.

2. The process of claim 1 in which the minor quantity is between 20% and 40%, and the curd tension of the final product is less than twenty grams.

3. The process of claim 1 in which the first curd tension does not exceed fifteen grams.

4. The process of claim 1 in which the minor quantity is between 20% and 40%, the enzyme is rennin, and the curd tension of the final product does not exceed twenty grams.

5. The process of claim 1 in which the enzyme is rennin and the first curd tension does not exceed fifteen grams.

6. The process of claim 1 in which the minor quantity of the untreated hard curd milk is more than four per cent greater than the least amount of untreated hard curd milk which would produce fine flakes on boiling.

7. The process of claim 1 in which the percentage of untreated milk to be used is found by experimentally testing mixtures of treated and untreated milk in various ratios between 85 to 15 and 60 to 40 to determine which of the experimental samples does produce flakes on being brought to boiling, adding a factor of safety to the percentage of untreated milk in such selected experimental sample, then adding that calculated percentage of untreated hard curd milk to the body of treated milk, thus producing a soft curd milk which will not flake or curd on being held at boiling temperature for three minutes.

8. The process of claim 1 in which the quantity of the untreated milk is determined by testing a number of small specimens of mixed treated and untreated milk varying between 85%–15% and 60%–40% to determine what ratio will produce fine flakes on boiling for three minutes, then adding untreated milk to the body of treated milk in a percentage five in number greater than the so-found minimum percentage that will produce fine flakes on boiling.

9. The method of producing a blended milk that will not curdle on being brought to boiling, which consists in intimately mixing with milk at roughly 125° F. a quantity of milk curdling enzyme just sufficient to cause the formation of curds when a small sample of the treated milk is shaken with alcohol from seven to nine minutes after the addition of the enzyme, raising the temperature of the treated milk to 145° in a period of time not exceeding ten minutes, and then mixing with the thus treated milk from 20% to 40% of an untreated milk.

10. The process of claim 9 in which the enzyme is rennin and the final curd tension of the milk is less than 20 grams.

11. The process of claim 9 in which the blend is held at a pasteurizing temperature for an additional half-hour.

12. The process of claim 9 in which the treated milk is cooled before blending and the untreated milk is pasteurized before blending.

13. A method of preparing a soft curd milk which will not flake or curdle on being brought to a boiling temperature, is free of a cooked flavor, and has a well-defined cream line, which comprises: treating a body of hard curd milk with a milk curdling enzyme to reduce the curd tension to a value well below that of soft curd milk and at which the treated milk would curdle on boiling, rendering the enzyme inactive by heating the milk-enzyme mixture to a pasteurizing temperature shortly prior to the formation of curds by action of the enzyme and then mixing with the resulting fluid a quantity of untreated hard curd milk to raise the curd tension to a value below that of soft curd milk, said quantity being at least 15% of the final product.

RAYMOND G. HELMER.
MERLE G. FARNHAM.